United States Patent
Fujii

[11] Patent Number: 5,936,947
[45] Date of Patent: Aug. 10, 1999

[54] MOBILE COMMUNICATION SYSTEM AND CONTROL CHANNEL SETTING METHOD IN MOBILE COMMUNICATION SYSTEM

[75] Inventor: Tatsuya Fujii, Tokyo, Japan

[73] Assignee: NEC Corporation, Tokyo, Japan

[21] Appl. No.: 08/883,450

[22] Filed: Jun. 26, 1997

[30] Foreign Application Priority Data

Jun. 28, 1996 [JP] Japan .................................. 8-169165

[51] Int. Cl.$^6$ .............................. H04Q 7/36; H04Q 11/04
[52] U.S. Cl. .......................... 370/280; 370/337; 370/442
[58] Field of Search .................................. 370/280, 294, 370/321, 328–330, 336, 337, 345, 347, 442, 498, 445, 447, 448; 455/515, 516

[56] References Cited

U.S. PATENT DOCUMENTS

| | | | |
|---|---|---|---|
| 5,260,944 | 11/1993 | Tomabechi | 370/347 |
| 5,357,123 | 10/1994 | Andersson et al. | 370/333 |
| 5,594,720 | 1/1997 | Papadopoulaos et al. | 370/330 |
| 5,732,073 | 3/1998 | Kusaki et al. | 370/280 |
| 5,761,198 | 6/1998 | Kojima | 370/337 |
| 5,818,831 | 10/1998 | Otonari | 370/347 |

FOREIGN PATENT DOCUMENTS 7-264659 10/1995 Japan .

*Primary Examiner*—Douglas W. Olms
*Assistant Examiner*—Seema S. Rao
*Attorney, Agent, or Firm*—Sughrue, Mion, Zinn, Macpeak & Seas, PLLC

[57] ABSTRACT

A mobile communication system includes a plurality of radio base stations and mobile stations. The system establishes radio connection between each radio base station and each mobile station by a TDMA-TDD scheme. Each radio base station includes an electric field strength measuring section, a search section, and a transmission timing control section. The electric field strength measuring section measures the reception input voltages of control channels from adjacent radio base stations. The search section searches for a transmission timing corresponding to the reception timing of a control carrier which does not contend with the transmission timings of control carriers in the adjacent radio base stations on the basis of the measurement result obtained by the electric field strength measuring section. The transmission timing control section transmits a carrier signal on the control channel at the searched-out transmission timing. A control channel setting method is also disclosed.

7 Claims, 5 Drawing Sheets

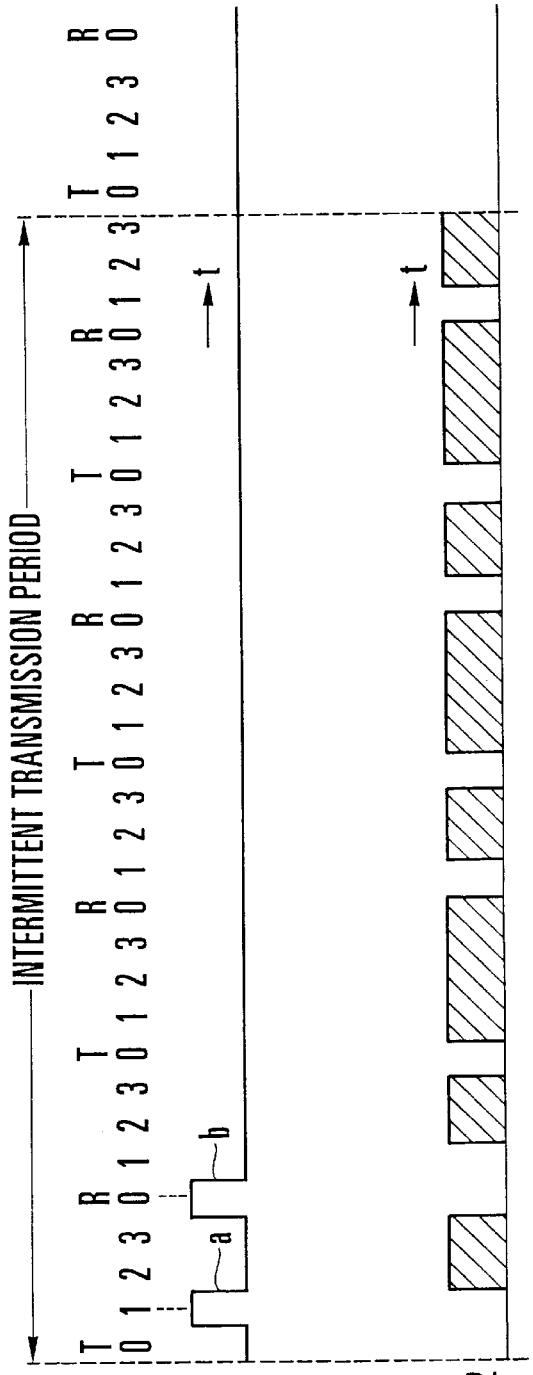
FIG. 2A RADIO BASE STATION 20
FIG. 2B RADIO BASE STATION 21
FIG. 2C SLOT NUMBER IN RADIO BASE STATION 22
FIG. 2D MEASUREMENT TIMING IN RADIO BASE STATION 22
FIG. 2E TRANSMISSION TIMING IN RADIO BASE STATION 22

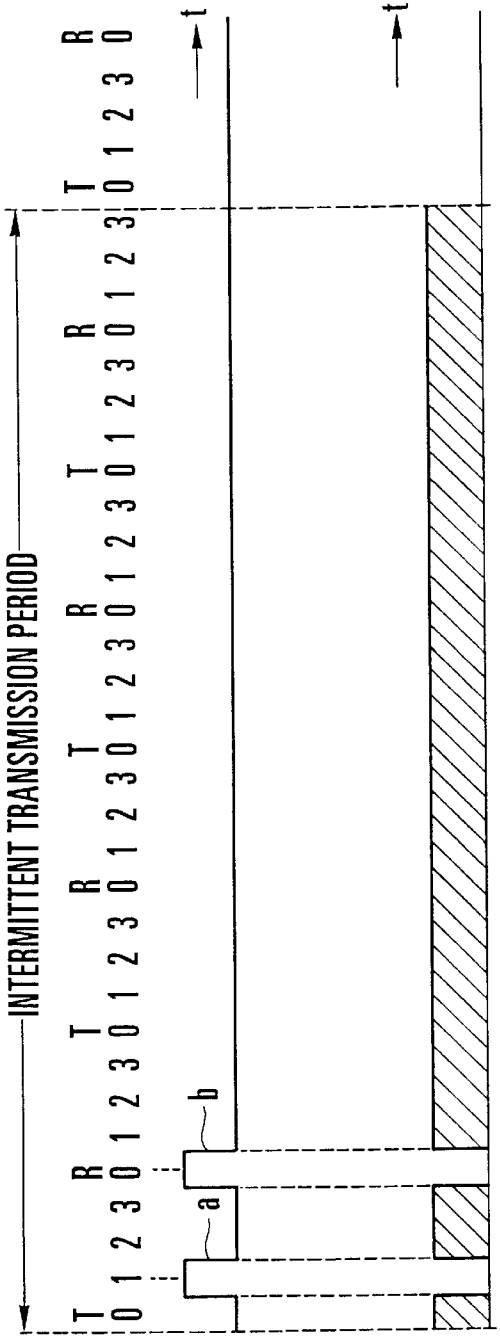
FIG. 5A PRIOR ART RADIO BASE STATION 20
FIG. 5B PRIOR ART RADIO BASE STATION 21
FIG. 5C PRIOR ART SLOT NUMBER IN RADIO BASE STATION 22
FIG. 5D PRIOR ART MEASUREMENT TIMING IN RADIO BASE STATION 22
FIG. 5E PRIOR ART TRANSMISSION TIMING IN RADIO BASE STATION 22

MOBILE COMMUNICATION SYSTEM AND CONTROL CHANNEL SETTING METHOD IN MOBILE COMMUNICATION SYSTEM

BACKGROUND OF THE INVENTION

The present invention relates to a mobile communication system in which radio connection between a radio base station and a mobile station is established by a TDMA-TDD (Time Division Multiple Access-Time Division Duplex) scheme and, more particularly, to a mobile communication system in which a given radio base station senses carrier signals intermittently transmitted from other radio base stations through control channels to detect the transmission timing of a control carrier to be transmitted from the given radio base station, and a control channel setting method in the mobile communication system.

In a conventional mobile communication system, as disclosed in Japanese Patent Laid-Open No. 7-264659, a plurality of radio base stations are connected to a public network, and radio connection between each radio base station and a mobile station is established by the TDMA-TDD scheme. If the control channels used by the respective radio base stations have the same frequency, each radio base station detects its own transmission timing on the control channel, and intermittently transmits data (carrier signals) at the detected transmission timing.

FIGS. 5A to 5E show the transmission timings of control carriers in radio base stations. Assume that radio base stations A and B are connected to a public network and start their operations to transmit carrier signals a and b on control channels at predetermined intermittent transmission periods, as shown in FIGS. 5A and 5B.

A radio base station C adjacent to the radio base stations A and B measures the reception input voltages of the carrier signals transmitted on the control channels from the radio base stations A and B to detect the control channels on which the signals are being transmitted from the radio base stations A and B. As a result, as shown in FIG. 5D, the radio base station C can obtain the transmission timings on the control carriers in the radio base stations A and B. Assume that transmission timings T0 to T3 and R0 to R3 are set as shown in FIG. 5C in the radio base station C. In this case, the transmission timings of the carrier signals a and b in the radio base stations A and B which are measured by the radio base station C are the transmission timings T1 and R0.

Upon detection of the transmission timings of the control carriers in the adjacent radio base stations A and B, the radio base station C obtains transmission allowable intervals excluding the transmission timings T1 and R0 as indicated by the hatched portions in FIG. 5E, and determines one of the transmission timings T0 to T3 and R0 to R3 in the obtained transmission allowable intervals as the transmission timing of a control carrier to be transmitted from the radio base station C, thereby preventing interference with the control channels in the radio base stations A and B.

In the above conventional system, in consideration of the transmission timings of the control carriers in the adjacent radio base stations A and B, the transmission timing of the control carrier in the radio base station C is set to prevent contention with the transmission timings under consideration. For this reason, the reception timing (reception slot) of a control carrier from a mobile station which exits in the zone covered by the radio base station C and demands connection may contend with the transmission timings (transmission slots) in the radio base stations A and B. In this case, the radio base station C cannot be connected to the mobile station in the zone, resulting in a deterioration in connectivity.

SUMMARY OF THE INVENTION

It is an object of the present invention to provide a mobile communication system which controls transmission timings to prevent the reception timing of a control carrier in a given radio base station from contending with the transmission timings of control carriers in adjacent radio base stations, thereby improving the connectivity between mobile stations, and a control channel setting method in the mobile communication system.

In order to achieve the above object, according to the present invention, there is provided a mobile communication system comprising a plurality of radio base stations and mobile stations, the system establishing radio connection between each radio base station and each mobile station by a TDMA-TDD (Time Division Multiple Access-Time Division Duplex) scheme, each of the radio base stations comprising measuring means for measuring a reception input voltage of a control channel from an adjacent radio base station, search means for searching for a transmission timing corresponding to a reception timing of a control carrier which does not contend with a transmission timing of a control carrier in the adjacent radio base station on the basis of the measurement result obtained by the measuring means, and transmission control means for transmitting a carrier signal on the control channel at the searched-out transmission timing.

BRIEF DESCRIPTION OF THE DRAWINGS

FIGS. 2A and 2B are timing charts showing the transmission timings of control carriers in adjacent radio base stations;

FIG. 2C is a timing chart showing the slot numbers set in a radio base station which performs transmission timing control of a control carrier;

FIG. 2D is a timing chart showing the measured transmission timings of the control carriers in the adjacent radio base stations;

FIG. 2E is a timing chart showing the allowable transmission timings of control carriers;

FIGS. 5A to 5E are timing charts for explaining the transmission timings of control carriers in conventional radio base stations.

DESCRIPTION OF THE PREFERRED EMBODIMENT

The present invention will be described below with reference to the accompanying drawings.

Figure 1:
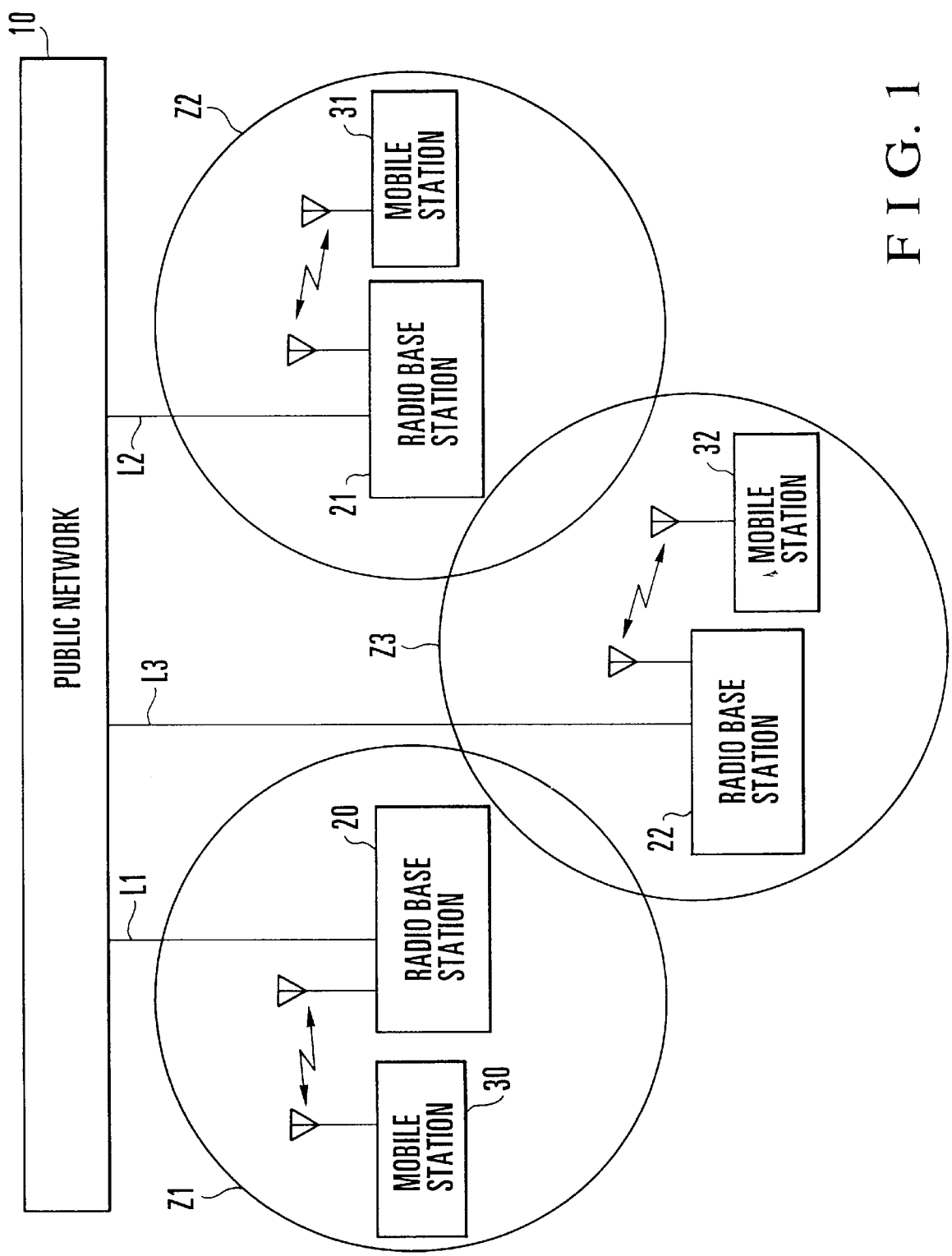
FIG. 1 is a block diagram showing the schematic arrangement of a mobile communication system according to an embodiment of the present invention.

FIG. 1 shows the schematic arrangement of a digital mobile communication system according to an embodiment of the present invention. The mobile communication system shown in FIG. 1 includes a public network 10, a plurality of radio base stations 20 to 22 connected to the public network 10 through lines L1 to L3, and mobile stations 30 to 32 radio-connected to the radio base stations 20 to 22. Reference symbols Z1 to Z3 denote the radio zones of the radio base stations 20 to 22. The radio base stations 20 to 22 are adjacent to each other. Each radio base station can receive radio waves emitted from the adjacent radio base stations.

As is known, the radio channels used by the radio base stations 20 to 22 include control channels and speech channels. Since the carrier frequencies on the control channels are the same, the radio base stations 20 to 22 time-divisionally use the control channels having the same frequency.

As shown in FIGS. 2A and 2B, the radio base stations 20 and 21 are connected to the public network 10, and start their operations to intermittently transmit data (carrier signals) a and b on the control channels. In this case, the radio base station 22 adjacent to the radio base stations 20 and 21 measures the reception input voltages of control carriers from the radio base stations 20 and 21 to detect the transmission timings of the control carriers in the radio base stations 20 and 21. As a result, as shown in FIG. 2D, the radio base station 22 can obtain the transmission timing of the control carriers in the radio base stations 20 and 21.

In order to prevent the reception timing of the control channel in the radio base station 22 from contending with the transmission timings of the control carriers in the radio base stations 20 and 21, the radio base station 22 assigns temporary slot numbers to the measured transmission timings (FIG. 2D) of the control carriers in the radio base stations 20 and 21, as shown in FIG. 2C. Assume that the TDMA multiplex count in the TDMA-TDD scheme is set to "4". In this case, slots T0 to T3 and slots R0 to R3 are set, and the transmission timings of control carriers in the radio base stations 20 and 21 are assigned to the slots T0 to T3 and the slots R0 to R3. The radio base station 22 then determines specific slots which correspond to the control channels which are being used for transmission by the radio base stations 20 and 21, and calculates the number of control channels in use in units of slots.

In this embodiment, while the radio base station 20 is transmitting data in the slot T1 on the control channel, and the radio base station 21 is transmitting data in the slot R0 on the control channel, no radio base station is using the control channel in other slots. For this reason, when the radio base station 22 is to transmit a carrier signal by using the control channel, it suffices if the station avoids contention between the reception timing of a control carrier and the slots T1 and R0.

The radio base station 22 therefore sets a transmission timing to prevent the slots T1 and R0 used as transmission timings in the radio base stations 20 and 21 from contending with the reception timing (reception slot) in the station 22. More specifically, the radio base station 22 sets one of the slots R0, R2, R3, T0, T2, and T3, excluding the slots R1 and T1, as the transmission timing (transmission slot) of a control carrier in the station 22, as indicated by the hatched portions in FIG. 2E, so as not to set the slots R1 and T0, which are the reception timings corresponding to the slots T1 and R0, as transmission slots. In this manner, the reception timing of a control channel in a given station is set so as not to contend with the transmission timings of control carriers in adjacent radio base stations, thereby ensuring good connectivity with respect to mobile stations.

Figure 3:
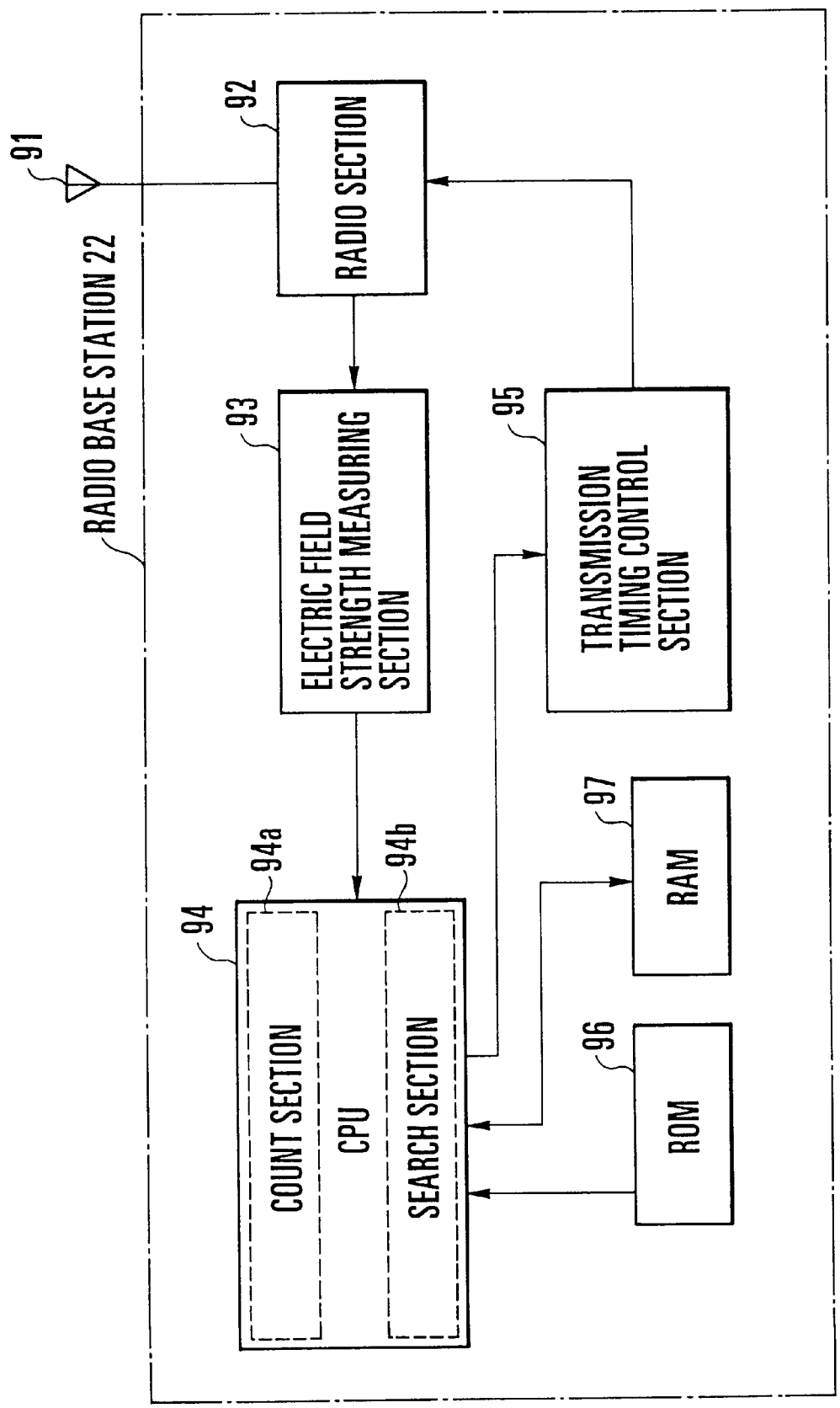
FIG. 3 is a block diagram showing the arrangement of the main part of a radio base station in FIG. 1.

As shown in FIG. 3, the radio base station 22 which performs the above transmission timing control includes an antenna 91, a radio section 92 for transmitting/receiving a radio signal to/from a mobile station through the antenna 91, an electric field strength measuring section 93 for measuring an electric field strength on the basis of a reception signal from the radio section 92, a CPU (Central Processing Unit) 94 for executing control programs to perform transmission/reception control on a radio signal, a transmission timing control section 95 for controlling the transmission timing of a control carrier, a ROM (Read Only Memory) 96 storing the control programs executed by the transmission timing control section 95, and a RAM (Random Access Memory) 97 for storing various data. The CPU 94 includes a count section 94a for counting a contention count between each slot set in the home station and the transmission timings of control carriers in the adjacent radio base stations, and a search section 94b for searching for the transmission timing of a control carrier in the home station on the basis of the count value of the count section 94a.

In the radio base station 22 having the above arrangement, a carrier signal on a control channel which is received by the radio section 92 through the antenna 91 is sent to the electric field strength measuring section 93. The electric field strength measuring section 93 measures the reception input voltage of the carrier signal for a predetermined period of time. The count section 94a of the CPU 94 analyzes the data measured by the electric field strength measuring section 93, calculates the number of control channels (contention count) in units of set slot numbers depending on the presence/absence of a carrier signal on a control channel at this time, and stores the resultant data in the RAM 97.

Subsequently, on the basis of the data stored in the RAM 97 the search section 94b of the CPU 94 searches for a timing corresponding to the maximum number of reception slots which can be used in the home station, and notifies the transmission timing control section 95 of the searched-out timing. The transmission timing control section 95 instructs the radio section 92 to transmit a carrier signal on the control channel at the notified timing. As a result, the carrier signal is transmitted from the radio base station 22 to the mobile station 32 at the optimal transmission timing on the control channel. In the case shown in FIG. 2E, the slots R0, R2, R3, T1, T2, and T3 which are not used by the adjacent radio base stations 20 and 21 are searched out the timings corresponding to the maximum number of reception slots which can be used in the home station, and the transmission timing control section 95 is notified of one of the slots as the transmission timing (transmission slot) of a control carrier in the home station.

Figure 4:
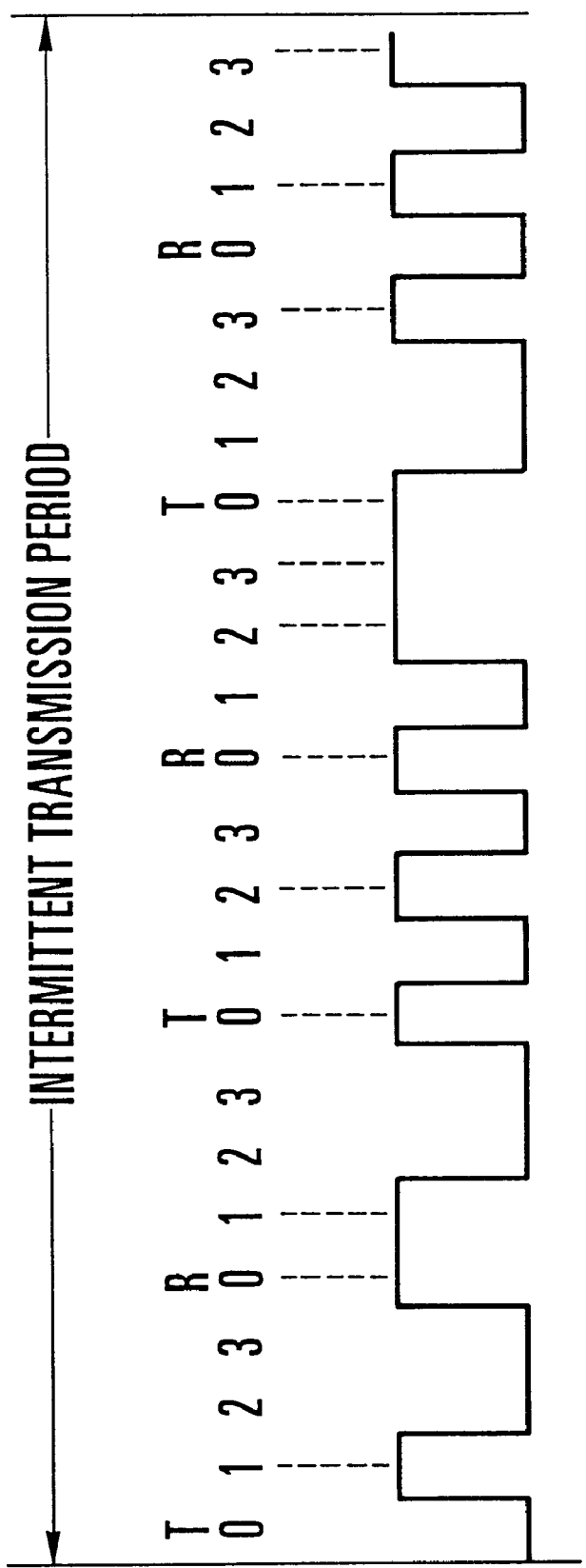
FIG. 4 is a timing chart showing other examples of the measured transmission timings of control carriers in the adjacent radio base stations.

A transmission timing control operation to be performed when the number of adjacent radio base stations is large, and the number of slots on control channels which are used in the adjacent radio base stations is large will be described next with reference to FIG. 4. In this case, all the slots on the control channels are used by the adjacent radio base stations, and the slots contend with the reception slots in the home station.

In this case, the radio base station 22 counts the number of control channels in contentions in units of slots, and select slots corresponding to the minimum number of control channels in contention. In this case, the slots T1, T2, T3, and R2 correspond to one control channel in contention, whereas the slots T0, R0, R1, and R3 correspond to two control channels in contention. The radio base station 22 therefore selects the slots T1, T2, T3, and R2 corresponding to the minimum number of control channels in contention, and sets one of the timings at which the selected slots T1, T2, T3, and R2 become reception slots, i.e., one of the slots R1, R2, R3, and T2, as the transmission timing of a control carrier in the station 22.

With this arrangement, the radio base station 22 can transmit information on a control channel at the timing at which the reception efficiency of the control channel is high, and can properly establish radio connection with the mobile station 32 in the zone of the station 22. In addition, the radio base station 22 can avoid interference with carrier signals on the control channels in the adjacent radio base stations 20 and 21.

As has been described above, according to the present invention, the transmission timing of a control carrier in a given radio base station is determined such that the transmission timings of control carriers in adjacent radio base stations do not interfere with the reception timing of a control carrier in the given station, or the contention count is minimized. With this operation, radio connection with a mobile station in the zone of the given station can be properly established, thus improving the connectivity with respect to mobile stations.

What is claimed is:

1. A mobile communication system comprising a plurality of radio base stations and mobile stations, said system establishing radio connection between each radio base station and each mobile station by a TDMA-TDD (Time Division Multiple Access-Time Division Duplex) scheme, each of said radio base stations comprising:

measuring means for measuring a reception input voltage of a control channel from an adjacent radio base station;

search means for searching for a transmission timing corresponding to a reception timing of a control carrier which does not contend with a transmission timing of a control carrier in said adjacent radio base station on the basis of the measurement result obtained by said measuring means; and transmission control means for transmitting a carrier signal on the control channel at the searched-out transmission timing.

2. A system according to claim 1, wherein said search means searches for one reception timing of timings in a home station, excluding the transmission timing of the control carrier in said adjacent radio base station, and sets a timing corresponding to the searched-out reception timing as a transmission timing when all transmission/reception timings in said home station are not occupied by the transmission timing of the control carrier in said adjacent radio base station.

3. A system according to claim 1, wherein said search means searches for a timing, as a transmission timing, which corresponds to a minimum contention count with respect to the transmission timing of the control carrier in said adjacent radio base station, and sets the searched-out timing as a transmission timing when all transmission/reception timings in a home station are occupied by the transmission timing of the control carrier in said adjacent radio base station.

4. A system according to claim 1, further comprising count means for counting a contention count with respect to the transmission timing of the control carrier in said adjacent radio base station in units of consecutive slots set for transmission/reception of a control carrier in a home station, and wherein said search means searches for a transmission timing in consideration of a slot corresponding to a minimum count value of said count means.

5. A control channel setting method as a control carrier sensing method for a mobile communication system including a plurality of radio base stations and mobile stations, said system establishing radio connection between each radio base station and each mobile station by a TDMA-TDD (Time Division Multiple Access-Time Division Duplex) scheme, comprising the steps of:

measuring a reception input voltage of a control channel from an adjacent radio base station;

searching for a transmission timing corresponding to a reception timing of a control carrier which does not contend with a transmission timing of a control carrier in said adjacent radio base station on the basis of the measurement result; and transmitting a carrier signal on the control channel at the searched-out transmission timing.

6. A method according to claim 5, wherein the step of searching for a transmission timing comprises the step of searching for one reception timing of timings in a home station, excluding the transmission timing of the control carrier in said adjacent radio base station, and setting a timing corresponding to the searched-out reception timing as a transmission timing when all transmission/reception timings in said home station are not occupied by the transmission timing of the control carrier in said adjacent radio base station.

7. A method according to claim 5, wherein the step of searching for a transmission timing comprises the step of searching for a timing, as a transmission timing, which corresponds to a minimum contention count with respect to the transmission timing of the control carrier in said adjacent radio base station, and setting the searched-out timing as a transmission timing when all transmission/reception timings in a home station are occupied by the transmission timing of the control carrier in said adjacent radio base station.

* * * * *